(12) United States Patent
Larocque et al.

(10) Patent No.: US 8,339,305 B2
(45) Date of Patent: Dec. 25, 2012

(54) METHOD FOR DETECTING AN OBJECT WITH A FREQUENCY MODULATED CONTINUOUS WAVE (FMCW) RANGING SYSTEM

(75) Inventors: Jean-René Larocque, Peterborough (CA); Michael Shenouda, Hamilton (CA)

(73) Assignee: Siemens Aktiengesellschaft, Munich (DE)

( * ) Notice: Subject to any disclaimer, the term of this patent is extended or adjusted under 35 U.S.C. 154(b) by 159 days.

(21) Appl. No.: 12/883,861

(22) Filed: Sep. 16, 2010

(65) Prior Publication Data

US 2011/0211644 A1    Sep. 1, 2011

(30) Foreign Application Priority Data

Sep. 17, 2009    (EP) .................................... 09170494

(51) Int. Cl.
*G01S 13/08*    (2006.01)

(52) U.S. Cl. .................... 342/124; 342/128; 342/196

(58) Field of Classification Search .................. 342/124, 342/128, 192, 196
See application file for complete search history.

(56) References Cited

U.S. PATENT DOCUMENTS

| | | | | |
|---|---|---|---|---|
| 3,601,696 A | * | 8/1971 | Chovan et al. | 324/76.25 |
| 3,623,097 A | * | 11/1971 | Femenias | 342/128 |
| 4,167,879 A | * | 9/1979 | Pedersen | 73/610 |
| 4,389,649 A | * | 6/1983 | Parkhurst et al. | 342/189 |
| 4,542,657 A | * | 9/1985 | Barber et al. | 73/861.25 |
| 5,252,981 A | | 10/1993 | Grein et al. | |
| 5,349,358 A | * | 9/1994 | Canal | 342/128 |
| 5,440,310 A | * | 8/1995 | Schreiner | 342/124 |
| 5,461,921 A | * | 10/1995 | Papadakis et al. | 73/628 |
| 6,107,957 A | | 8/2000 | Cramer et al. | |
| 6,225,941 B1 | * | 5/2001 | Gogineni et al. | 342/22 |
| 7,114,390 B2 | * | 10/2006 | Lizon et al. | 73/290 |
| 2005/0001761 A1 | | 1/2005 | Kliewer et al. | |

FOREIGN PATENT DOCUMENTS

GB    2 350 004    11/2000

* cited by examiner

*Primary Examiner* — John B Sotomayor
(74) *Attorney, Agent, or Firm* — Cozen O'Connor

(57) ABSTRACT

In a method for detecting an object with an FMCW (frequency modulated continuous wave) ranging system a superior accuracy and resolution is obtained by determining the strongest sinusoidal component in the frequency spectrum and removing the determined component from the spectrum, repeating the preceding step at least once, adding one of the components determined in the two preceding steps to the spectrum, re-determining the then strongest sinusoidal component in the spectrum and removing the re-determined component from the spectrum, repeating the preceding step for each remaining of the determined sinusoidal components, and repeating the last two steps until a desired degree of convergence is reached.

10 Claims, 2 Drawing Sheets

-- Prior Art --

METHOD FOR DETECTING AN OBJECT WITH A FREQUENCY MODULATED CONTINUOUS WAVE (FMCW) RANGING SYSTEM

BACKGROUND OF THE INVENTION

1. Field of the Invention

The invention relates to a method for detecting objects and, more particularly, to a method for detecting an object with a frequency modulated continuous wave (FMCW) ranging system.

2. Description of the Related Art

Conventional FMCW ranging systems may be sound or microwave-based, and are used for performing distance or level measurements in industrial process control, factory automation or automotive applications.

Here, a transmitted signal is modulated to periodically sweep over a predetermined frequency range. A received signal, which comprises echo signal portions from the object of interest and other obstacles, is mixed with the transmitted signal and the result is analyzed by, e.g., a Fast Fourier Transform (FFT) to obtain a frequency spectrum in which the echoes appear as peaks. The echoes or peaks in the frequency spectrum (i.e., the echo profile) may be separate or may overlap.

When, for example, measuring the level of material within a closed vessel, the echo from the material is often distorted by echoes from other scatterers, such as obstacles or welded seams. Here, the distortion in the echo introduces error in the level being reported when the echo from the material is close to an echo from an obstacle. It is known that the echoes from scatterers often overlap the main echo, and that there is no clear discrimination between them. This overlapping of the scatterers and the main echo is an intrinsic limitation of FMCW ranging systems.

Typically, radar devices operating in enclosed vessels have a wide bandwidth to achieve high resolution, i.e., the ability to resolve two targets. To operate in open air, however, the bandwidth is governed by other sets of rules, such as those of the Federal Communications Commission (FCC) in the U.S., and it is generally limited to a much narrower bandwidth. A narrower bandwidth, however, will cause the frequency difference between two targets to be smaller. A narrower bandwidth also means that the peaks on the echo profile will be much wider. The combination of these two factors reduces greatly the ability of the device to operate in open air and still achieve reasonable accuracy or ranging resolution.

The most commonly applied technique to identify an echo of interest relies on the power spectrum density (PSD), usually calculated by an FFT, to estimate the frequency of interest as the frequency corresponding to the largest component of the FFT-PSD. Because of the sampled nature of the FFT-PSD, the largest component of the PSD may not be the peak of the true spectrum or the true peak of interest whose accurate position can then be estimated by using a center of mass algorithm about the largest component in the power spectrum.

An FFT and estimations based on the power spectrum discard a lot of information and limit the separation power of current FMCW devices.

SUMMARY OF THE INVENTION

It is therefore an object of the present invention to provide a method for detecting an object with a frequency modulated continuous wave (FMCW) ranging system that achieves superior accuracy and resolution without the need to increase the bandwidth.

This and other objects and advantages are achieved in accordance with the invention by providing a method comprising transmitting a signal towards an object, receiving a reflected signal caused by reflections of the transmitted signal, calculating a frequency difference signal of the transmitted signal and the received reflected signal, determining a frequency spectrum of the frequency difference signal, and analyzing the frequency spectrum to determine a frequency which is related to the object to be detected. In accordance with the method of the invention, analyzing the frequency spectrum comprises determining a strongest sinusoidal component in the frequency spectrum and removing the determined component from the spectrum, repeating the prior determining step at least once, adding one of the components determined in the two preceding steps to the spectrum, re-determining the subsequently strongest sinusoidal component in the spectrum and removing the re-determined component from the spectrum, repeating the prior re-determining step for each of the remaining determined sinusoidal components, and repeating the last two steps until a desired degree of convergence is reached.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are described in detail hereinafter with reference to the accompanying figures, in which.

DETAILED DESCRIPTION OF THE PRESENTLY PREFERRED EMBODIMENTS

The method in accordance with the invention is based on the assumption that in most measuring situations there will be only a few targets that produce significant echoes. For example, measuring the level of material within a tank will typically produce one clear echo from the material or two significant echoes from the material and a fixed obstacle or the tank bottom. For that reason, the disclosed method in accordance with the invention iteratively estimates relevant parameters, such as amplitude, frequency and phase of these few strongest sinusoidal components present in the frequency spectrum until some measure of convergence is achieved. The disclosed iterative approach permits the refinement of poor first initial estimates. In conventional recursive algorithms, which do not re-estimate the parameters of the first sinusoidal component, initial errors might propagate. In contrast, however, the iterative approach in accordance with the method of the invention advantageously avoids this problem.

Preferably, the frequency spectrum is determined by Fast Fourier Transformation (FFT). However there are many other techniques that can be used, including autoregressive (AR), autoregressive moving average (ARMA), minimum-entropy methods and spectral-parameter estimation including multiple signal classification (MUSIC) algorithm.

In a preferred embodiment, the analysis of the frequency spectrum is limited to a window that encompasses an expected value of the frequency related to the object to be detected. As echoes outside the window are discarded from the analysis, the number of echoes to be considered is reduced, and the number of different sinusoidal components to be estimated is similarly reduced. At best, there will be only at most two significant echoes to be considered, e.g., the main echo from the object of interest and an interfering echo from its surroundings.

Additionally or alternatively, prior to the analysis, the frequency spectrum is band-pass filtered around an expected value of the frequency related to the object to be detected or at the expected value of the frequency related to the object to be detected. As a result, unwanted echoes, such as those caused by internal mismatches and multiple echoes of the measurement environment, are attenuated.

The expected value of the frequency related to the object may be estimated without the window in a measuring situation when the echo of interest is the only echo, the echo is clearly distinguishable from other echoes or when the position of the object is known, such as when the tank is empty. Once the frequency related to the object is detected, the expected value of the frequency may be replaced by the determined frequency related to the object and tracked in subsequent detection cycles.

Figure 1:
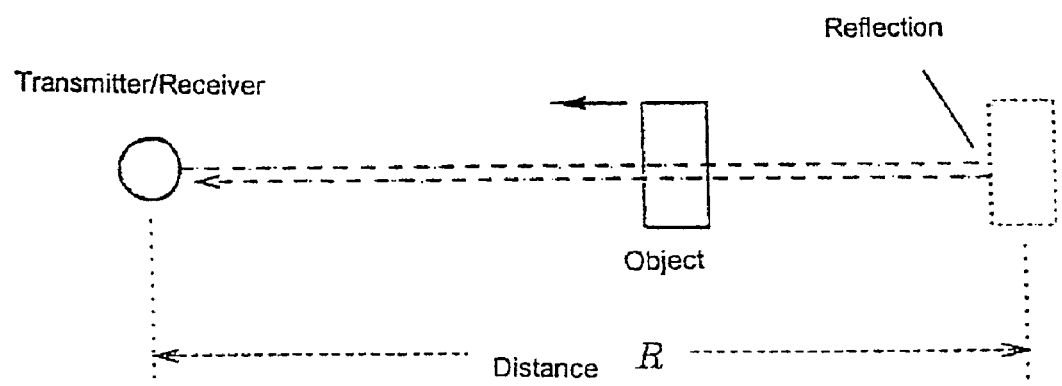
FIG. 1 is an exemplary schematic block diagram of a reflection of a transmitted signal on an object at a distance R.

The method according to the invention is preferably used for level measurement and with a conventional radar-based FMCW range system, as shown schematically in FIG. 1.

Figure 2:
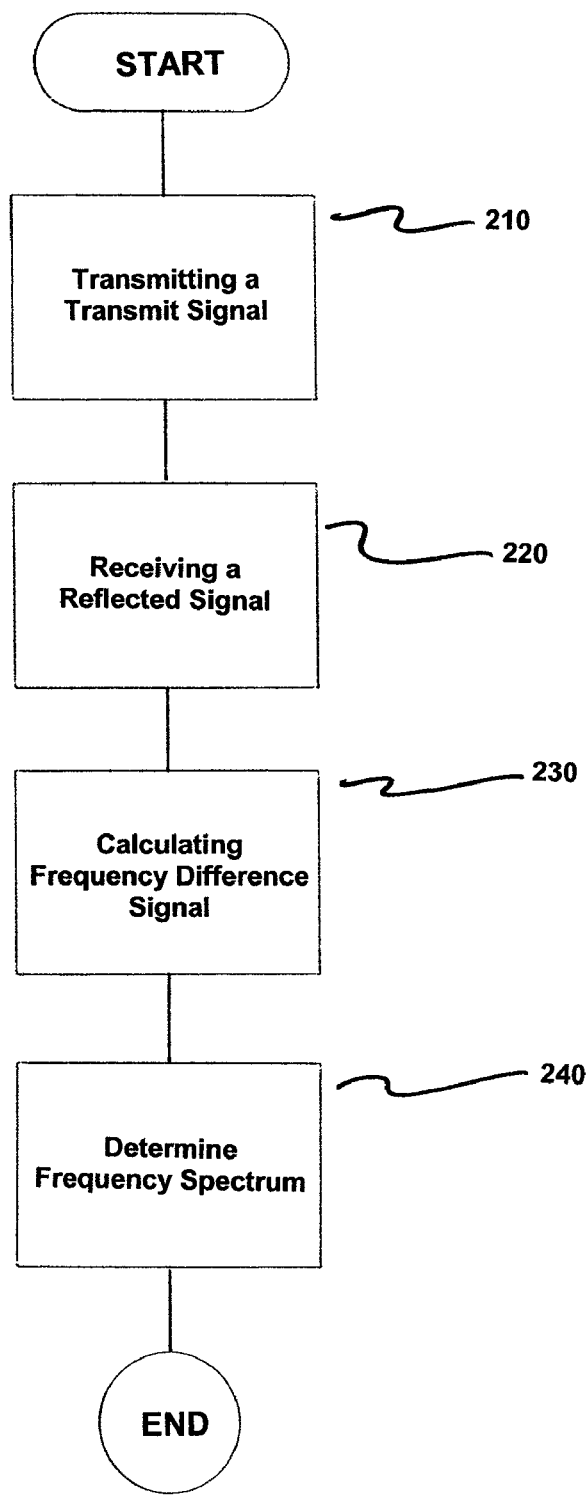
FIG. 2 is a flow chart illustrating a method in accordance with an embodiment of the invention.

FIG. 2 is a flow chart of a method for detecting an object with an frequency modulated continuous wave (FMCW) ranging system. The method comprises transmitting a signal towards the object, as indicated in step 210. A reflected signal caused by reflections of the transmit signal is then received, as indicated in step 220. Next, a frequency difference signal of the transmit signal and the received reflected signal is calculated, as indicated in step 230. A frequency spectrum of the frequency difference signal is then determined and the frequency spectrum is analyzed to determine a frequency related to the object to be detected, as indicated in step 240.

In accordance with the method of the invention, the analysis of the frequency spectrum comprises determining a strongest sinusoidal component in the frequency spectrum and removing the determined component from the spectrum, repeating the prior determining step at least once, adding a component determined in the prior determining and repeating steps to the frequency spectrum, and re-determining the strongest sinusoidal component in the frequency spectrum and removing the re-determined component from the frequency spectrum, repeating the adding step for each of remaining determined sinusoidal component, and repeating the adding and repeated adding step for each of remaining determined sinusoidal component steps until a desired degree of convergence is reached.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for detecting an object with an frequency modulated continuous wave (FMCW) ranging system, comprising:

transmitting a signal towards the object;

receiving a reflected signal caused by reflections of the transmitted signal;

calculating a frequency difference signal of the transmitted signal and the received reflected signal; and determining a frequency spectrum of the frequency difference signal and analyzing the frequency spectrum to determine a frequency related to the object to be detected, wherein analyzing the frequency spectrum comprises:

determining a strongest sinusoidal component in the frequency spectrum and removing the determined component from the spectrum;

repeating said prior determining step at least once;

adding a component determined in the prior determining and repeating steps to the frequency spectrum, and re-determining the strongest sinusoidal component in the frequency spectrum and removing the re-determined component from the frequency spectrum;

repeating the adding step for each of remaining determined sinusoidal component; and repeating the adding and repeated adding step for each of remaining determined sinusoidal component until a desired degree of convergence is reached.

2. The method of claim 1, wherein the frequency spectrum is determined by Fast Fourier Transformation (FFT).

3. The method of claim 1, wherein the analysis of the frequency spectrum is limited to a window encompassing an expected value of the frequency related to the object to be detected.

4. The method of claim 2, wherein the analysis of the frequency spectrum is limited to a window encompassing an expected value of the frequency related to the object to be detected.

5. The method of claim 1, wherein, prior to analysis, the frequency spectrum is band-pass filtered around an expected value of the frequency related to the object to be detected.

6. The method of claim 3, wherein, once the frequency related to the object is detected, the expected value of the frequency is replaced by the determined frequency related to the object and tracked in subsequent detection cycles.

7. The method of claim 1, wherein the method is implemented to perform level measurement in a container.

8. The method of claim 1, wherein the FMCW ranging system is a radar-based FMCW ranging system.

9. The method of claim 3, wherein, prior to analysis, the frequency spectrum is band-pass filtered around the expected value of the frequency related to the object to be detected.

10. The method of claim 9, wherein, once the frequency related to the object is detected, the expected value of the frequency is replaced by the determined frequency related to the object and tracked in subsequent detection cycles.

* * * * *